United States Patent
Steidle et al.

(10) Patent No.: US 12,552,343 B2
(45) Date of Patent: Feb. 17, 2026

(54) SENSOR AND BELT RETRACTOR

(71) Applicant: ZF AUTOMOTIVE GERMANY GMBH, Alfdorf (DE)

(72) Inventors: Alexander Steidle, Heubach (DE); Johann Hirsch, Alfdorf (DE); Friedjof Daimer, Illingen (DE); Christian Lux, Stuttgart (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 246 days.

(21) Appl. No.: 18/009,750

(22) PCT Filed: Jun. 2, 2021

(86) PCT No.: PCT/EP2021/064771
§ 371 (c)(1),
(2) Date: Dec. 12, 2022

(87) PCT Pub. No.: WO2021/254776
PCT Pub. Date: Dec. 23, 2021

(65) Prior Publication Data
US 2023/0242067 A1 Aug. 3, 2023

(30) Foreign Application Priority Data
Jun. 18, 2020 (DE) .................. 10 2020 116 105.5

(51) Int. Cl.
*B60R 22/40* (2006.01)

(52) U.S. Cl.
CPC ........ *B60R 22/40* (2013.01); *B60R 2022/401* (2013.01)

(58) Field of Classification Search
CPC .................... B60R 22/40; B60R 2022/401
See application file for complete search history.

(56) References Cited

U.S. PATENT DOCUMENTS

| 4,328,934 A | 5/1982 | Ahad |
| 5,145,123 A | 9/1992 | Kotikovsky |
| 2020/0307509 A1* | 10/2020 | Steidle ............... B60R 22/3416 |
| 2024/0336221 A1* | 10/2024 | Hirsch ................... B60R 22/40 |

FOREIGN PATENT DOCUMENTS

| DE | 3704209 A1 | 10/1987 |
| DE | 4005499 A1 | 8/1990 |
| DE | 102017126987 A1 | 5/2019 |
| GB | 1018955 A | 2/1966 |

OTHER PUBLICATIONS

PCT Search Report for corresponding PCT International Application Serial No. PCT/EP2021/064771, dated Aug. 31, 2021, pp. 1-4.

* cited by examiner

*Primary Examiner* — Sang K Kim
(74) *Attorney, Agent, or Firm* — Tarolli, Sundheim, Covell & Tummino LLP

(57) ABSTRACT

The invention describes a sensor (12) for activating a vehicle-sensitive locking mechanism (14) of a belt retractor (10), comprising a suspended inertia body (26) and a bearing (28) which supports the inertia body (26), the bearing (28) including a receiving space (58) for receiving lubricant. The invention further describes a belt retractor (10).

12 Claims, 5 Drawing Sheets

SENSOR AND BELT RETRACTOR

RELATED APPLICATIONS

This application is a U.S. National Stage Application filed under 35 USC 371, claiming priority to Serial No. PCT/EP2021/064771, filed on 2 Jun. 2021; which claims priority from German Patent Application DE 10 2020 116 105.0, filed 18 Jun. 2020, the entireties of which are hereby incorporated herein by reference.

TECHNICAL FIELD

The invention relates to a sensor for activating a vehicle-sensitive locking mechanism of a belt retractor as well as to a belt retractor.

BACKGROUND

Sensors for activating a vehicle-sensitive locking mechanism of a seat belt retractor are well-known. In the event of positive or negative vehicle acceleration as well as from a specific inclined position of the vehicle, an inertia body starts moving and results in pivoting of a sensor lever. As a result, a blocking pawl is lifted, thus causing a blocking mechanism which is adapted to block a belt reel and to prevent webbing from being extended to be activated in different ways.

In order to reduce noise emission which a vehicle occupant may feel to be disturbing, usually a lubricant is disposed on a contact surface of the inertia body with a suspension. Due to the frequent movement of the inertia body, said inertia body can be displaced from the intended position over the service life of the sensor.

SUMMARY

Therefore, it is an object of the present invention to provide a sensor for a vehicle-sensitive vehicle occupant restraint system in which noise emissions are avoided particularly reliably and in the long run.

This object is achieved, according to the invention, by a sensor for activating a vehicle-sensitive locking mechanism of a belt retractor, comprising a suspended inertia body and a bearing which supports the inertia body, the bearing including a receiving space for receiving lubricant. The object is further achieved by an assembly group comprising a belt retractor and an appropriately designed sensor.

The presence of the receiving space may help provide a sufficiently large amount of lubricant in the bearing of the sensor to attenuate noise particularly reliably and in the long run. Specifically, lubricant present in the receiving space serves as supply which can spread in the bearing when already part of the lubricant has been displaced from the bearing due to frequent movement of the inertia body.

The lubricant serves as dampening for the inertia body. In addition, the lubricant reduces friction between the inertia body and the bearing which has a beneficial effect on the service life of the sensor.

The lubricant is a solid lubricant, a grease or the like, for example.

According to one embodiment, the bearing has a bearing shell and a ball retained in the bearing shell. In this way, the inertia body is pivotally mounted and can particularly swing out similarly to all directions.

The receiving space is formed, for example, by an at least partially circumferential groove in the bearing shell. Specifically, the groove is provided on a contact surface between the bearing shell and the ball, the groove extending along an equator of the ball, for example. In this way, an increased amount of lubricant can be present along the equator of the ball, thus allowing lubricant from the receiving space to be spread evenly over a surface of the ball when the ball moves within the bearing.

Preferably, the groove is completely circumferential in the bearing shell.

The bearing shell is preferably made of two shell halves which are specifically put together. Alternatively, or additionally, the bearing shells may be adhesively bonded or welded. This renders manufacture of the bearing particularly simple.

The inertia body may be secured to the ball. Accordingly, the inertia body may be fabricated integrally with the ball or may be secured subsequently to the latter, such as by means of a pin which is secured both to the ball and to the inertia body. By securing the inertia body to the ball, the inertia body is reliably held in the bearing.

The inertia body may include a metal body through which an insert made of plastic extends, in particular with the ball being part of the insert. That is, the insert is part of the bearing. The metal body ensures sufficiently high weight to safeguard an appropriate oscillating behavior of the inertia body. The insert made of plastic in turn ensures proper frictional behavior, in particular on the contact surface between the ball and the bearing shell.

For example, the plastic insert is injected into the metal body. In this way, the metal body is captively connected to the plastic insert.

According to one embodiment, in the bearing shell there are provided a first opening through which the inertia body extends and a second opening facing the first opening, the second opening being communicated with a lubricant reservoir. The second opening serves, on the one hand, for filling lubricant into the bearing shell. In the lubricant reservoir which is preferably separate from the receiving space, additionally an excess of lubricant may be provided which can flow into the receiving space if required while the sensor is operated. For this purpose, the lubricant reservoir is funnel-shaped, for example.

The second opening is disposed specifically above the first opening and, resp., above the ball and is in direct communication with the lubricant reservoir so that lubricant can be continuously delivered by gravity from the lubricant reservoir into the bearing.

A collar configured to retain the bearing shell in a belt retractor can be formed integrally on the bearing shell. The collar is inserted, for example, in a mating guide in a housing of the belt retractor. As a result, additional fasteners for fastening the sensor can be dispensed with, thus allowing the sensor to be installed in a particularly simple and inexpensive manner.

According to one embodiment, the sensor includes a trigger element which can be moved out of an idle position by a movement of the inertia body so as to activate the vehicle occupant restraint system, with the inertia body being pivotable about a stationary rotation point. The pivotable mounting of the inertia body helps avoid excitations in the vertical direction, thus preventing the sensor from producing any disturbing noise during operation.

The trigger element is configured, for example, to engage a blocking pawl in locking teeth of a locking mechanism. In this way, the vehicle occupant restraint system can be activated such that a belt reel is blocked when tensile force acts upon a webbing of the belt reel.

BRIEF DESCRIPTION OF THE DRAWINGS

Further advantages and features of the invention will be evident from the following description and from the attached drawings which are referred to and wherein.

DESCRIPTION

Figure 1:
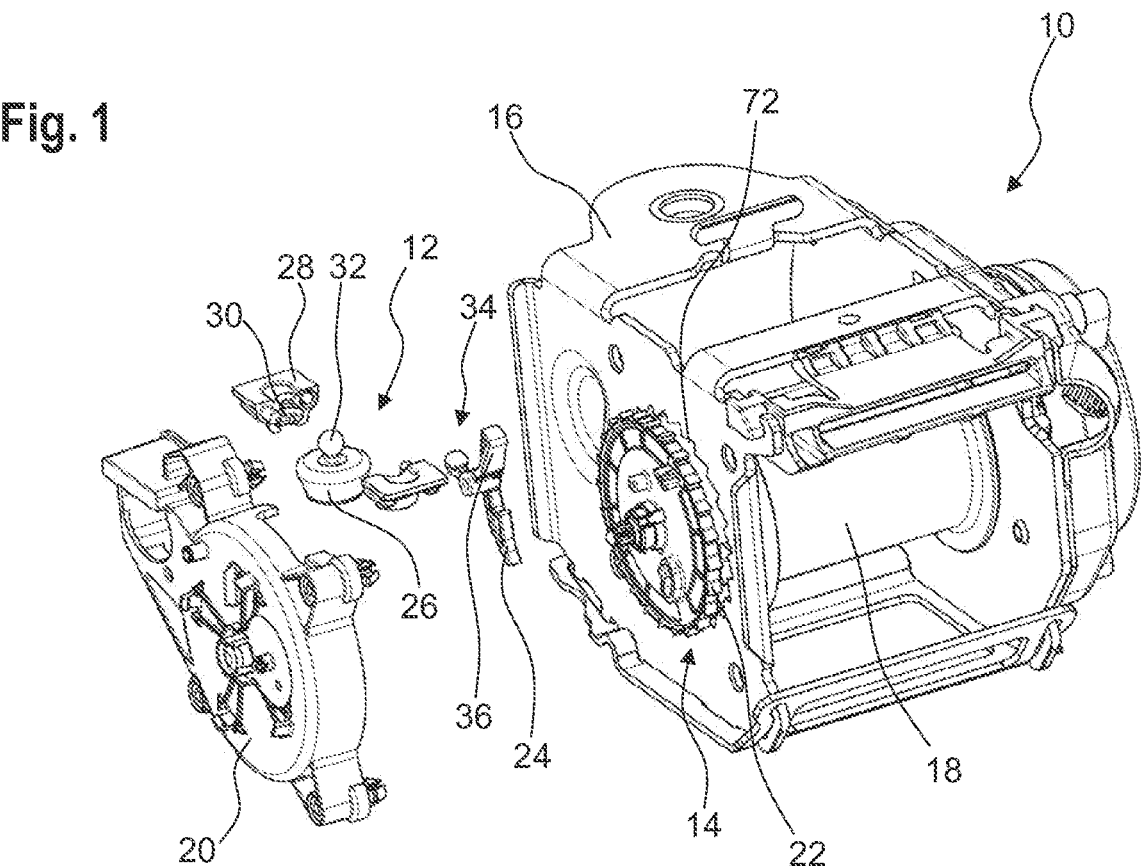
FIG. 1 shows a belt retractor according to the invention in an exploded view.

FIG. 1 illustrates a belt retractor 10 comprising a sensor 12 for activating a vehicle-sensitive locking mechanism 14 of the belt retractor 10 in an exploded view.

Apart from the sensor 12 and the locking mechanism 14, the belt retractor 10 comprises a housing 16, a belt reel 18 onto which webbing can be wound, and a cover 20 which covers the sensor 12 and the locking mechanism 14.

The locking mechanism 14 comprises locking teeth 22 which are coupled to the belt reel 18 via a spring mechanism, and a blocking pawl 24 which can engage in the locking teeth 22 to trigger a blocking mechanism that blocks rotation of the belt reel 18.

The sensor 12 comprises a suspended, specifically pivotally mounted inertia body 26 that is suspended in a bearing 28. The sensor 12 is specifically designed as an oscillating sensor.

The bearing 28 is formed by a two-part bearing shell 30 and a ball 32 held rotatably in the bearing shell 30. The ball 32 is tightly connected to and specifically formed integrally with the inertia body 26.

Moreover, the sensor 12 comprises an adjustably mounted trigger element 34 that is tightly connected to the blocking pawl 24. In the embodiment, the trigger element 34 is formed integrally with the blocking pawl 24. However, it is also conceivable for the trigger element 34 to be movable relative to the blocking pawl 24.

The trigger element 34 specifically is a pivotally mounted sensor lever.

Apart from the blocking pawl 24, in addition a wing arm 36 that is also formed integrally with the trigger element 34 is provided on the trigger element 34. The wing arm 36 is designed so that the trigger element 34 is balanced.

Figure 2:
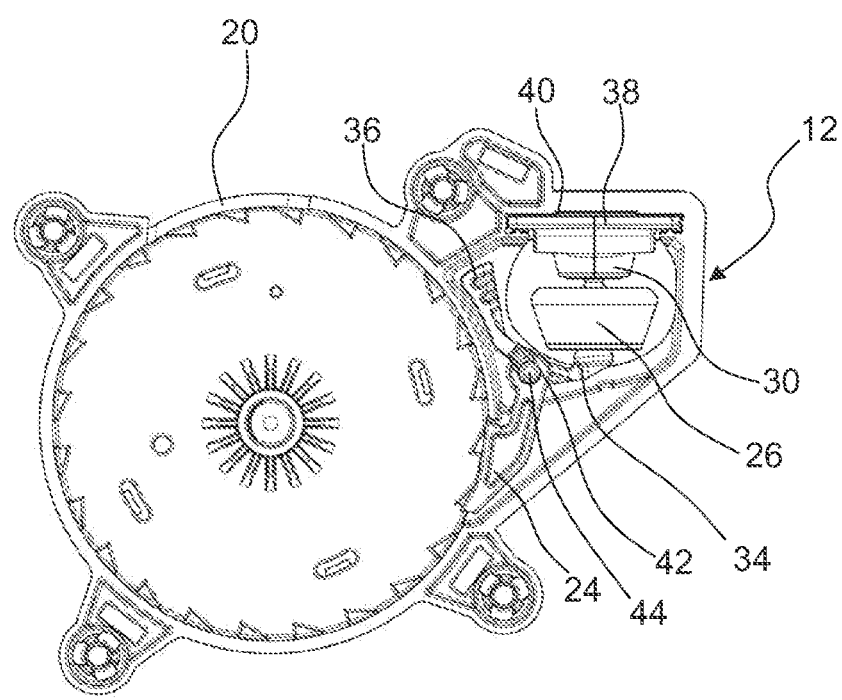
FIG. 2 shows part of the belt retractor in a lateral view.

FIG. 2 illustrates a lateral view of the sensor 12 which is preassembled in the cover 20 of the belt retractor 10.

The sensor 12 comprises a collar 38 that is formed on the bearing shell 30 and that is inserted in a mating seat 40 in the cover 20.

In FIG. 2, the sensor 12 is shown in a non-activated state in which the inertia body 26 is not deflected. In this state, the blocking pawl 24 is disengaged from the locking teeth 22.

Figure 3:
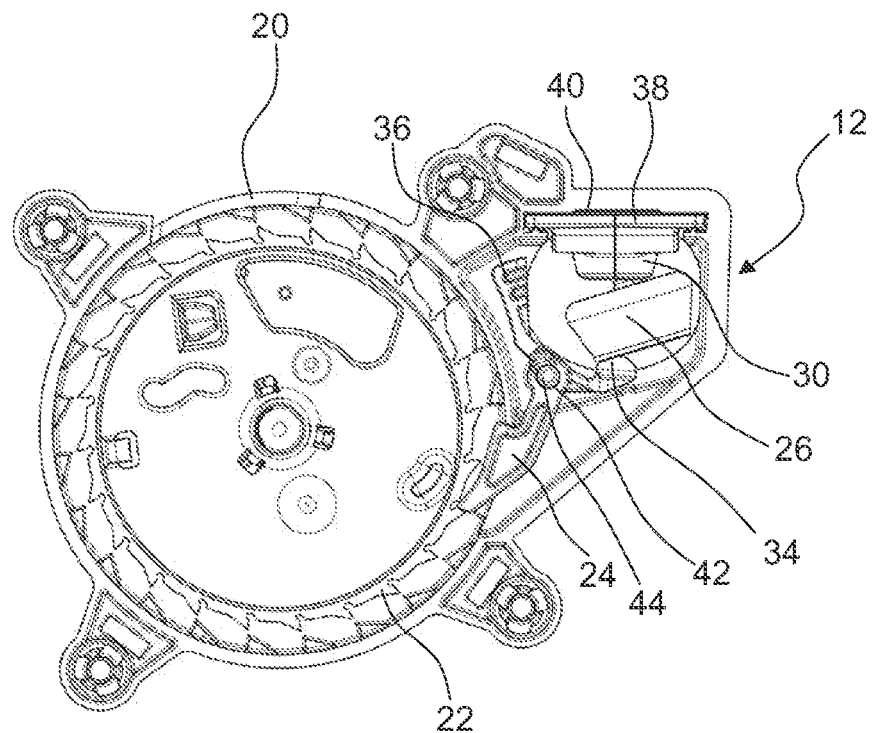
FIG. 3 shows a further lateral view of the belt retractor.

FIG. 3 also illustrates a lateral view of the sensor 12 in the cover 20, wherein the locking teeth 22 of the locking mechanism 14 are additionally shown.

FIG. 3 illustrates the sensor 12 in an activated state in which the inertia body 26 is deflected. In the deflected state of the inertia body 26, the blocking pawl 24 of the trigger element 34 is engaged in the locking teeth 22 so that rotation of the belt reel 18 is blocked.

In order to mount the trigger element 34 adjustably and specifically pivotally, the trigger element 34 includes an integrally formed sleeve 42 which is attached onto a journal 44 formed in the cover 20. As an alternative, the journal 44 can be formed on the trigger element 34 and the sleeve 42 can be formed on the cover 20.

Figure 4:
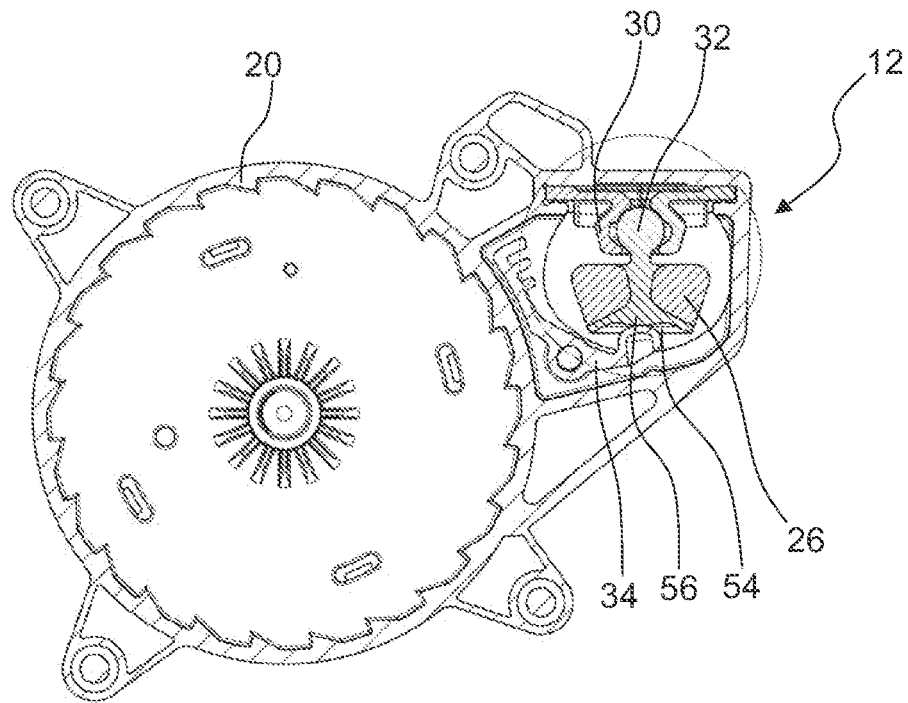
FIG. 4 shows a section across the belt retractor.
Figure 5:
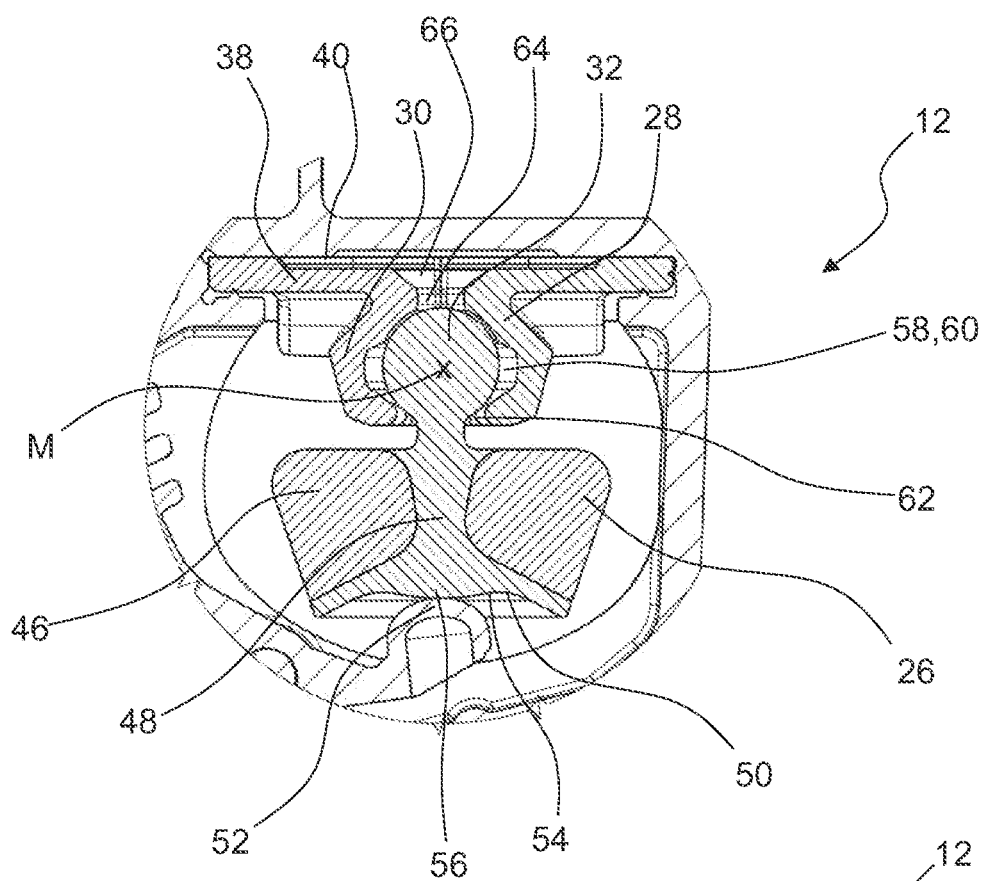
FIG. 5 shows a detail view of FIG. 4.

FIG. 4 illustrates a section across the belt retractor 10, the section extending across the center of the inertia body 26. FIG. 5 illustrates a detail view of the section from FIG. 4 in the area of the inertia body 26.

From FIGS. 4 and 5, the structure and the bearing of the inertia body 26 become clear.

In order to mount the inertia body 26 in a suspended manner, the ball 32 is received in the two-part bearing shell 30 in such a way that the bearing shell 30 encompasses the ball 32 along its equator.

The inertia body 26 is thus pivotable about a stationary rotation point.

Moreover, it is evident from the cross-sectional view that the inertia body 26 has a metal body 46 through which an insert 48 made of plastic extends. The insert 48 extends specifically up to a lower side 50 of the inertia body 26 and constitutes the lower side 50. The ball 32 is also made of plastic and is formed integrally with the insert 48.

Thus, the contact surfaces of the inertia body 26 and of the ball 32, respectively, which are in contact with other surrounding components, are made of plastic.

At the end 52 by which the trigger element 34 is in contact with the inertia body 26 the trigger element 34 is hemispherical.

The trigger element 34 specifically abuts on the lower side 50 of the inertia body 26.

From the cross-sectional view it is further evident that a recess 54 into which the trigger element 34, specifically the hemispherical end of the trigger element 34, protrudes is formed on the lower side 50 of the inertia body 26.

More precisely, the inertia body 26 includes, on its lower side 50, a wave-shaped geometry seen in a longitudinal section across the center of the inertia body 26, wherein an elevation 56 is formed in the center of the lower side 50, specifically in the center of the recess 54.

When the sensor 12 is not activated, the trigger element 34 abuts with its end 52 on the elevation 56 in the center of the recess 54.

An outer face of the elevation 56 extends concentrically around a center M of the ball 32, the center M corresponding also to a rotation point about which the inertia body 26 can be pivoted.

Figure 6:
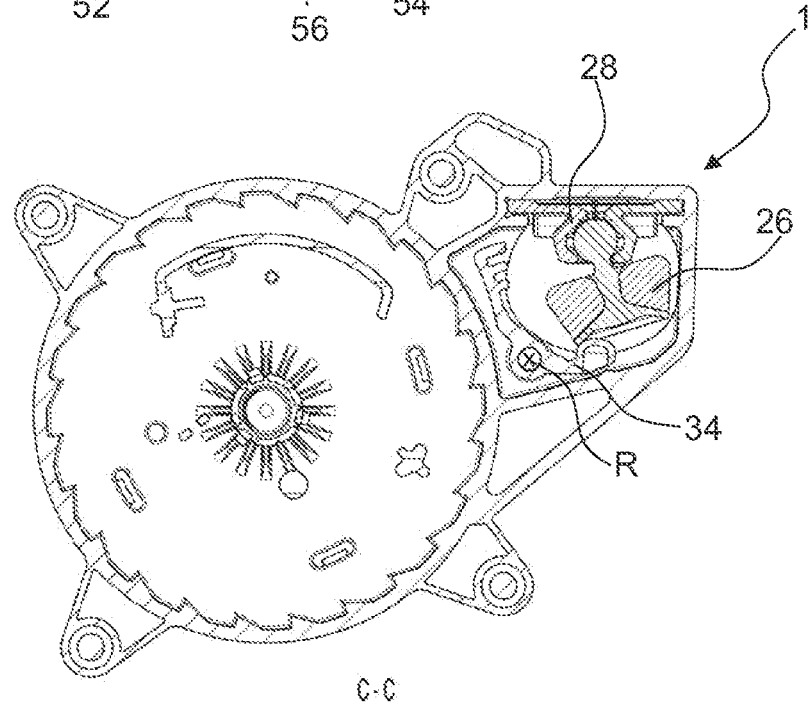
FIG. 6 shows a further section across the belt retractor.

When the inertia body 26 is deflected, as seen in FIG. 6, the trigger element 34 may be pivoted about a rotation point R.

In order to reduce friction within the bearing 28, a lubricant which is not shown in the Figures for reasons of clarity is present in the bearing shell 30.

For receiving the lubricant, the bearing includes a receiving space 58. The receiving space 58 is specifically formed by a circumferential groove 60 in the bearing shell 30. The groove 60 extends particularly along the equator of the ball 32.

The bearing shell 30 includes two openings, specifically a first opening 62 through which the inertia body 26 extends and a second opening 64 facing the first opening 62.

The second opening 64 is communicated with a lubricant reservoir 66 formed in the bearing 28.

Via the second opening 64, after assembling the sensor 12 lubricant can be filled, specifically by means of a nozzle, into the receiving space 58.

In the lubricant reservoir 66 an excess of lubricant may be provided which is continuously delivered into the receiving space 58 if required.

Figure 7:
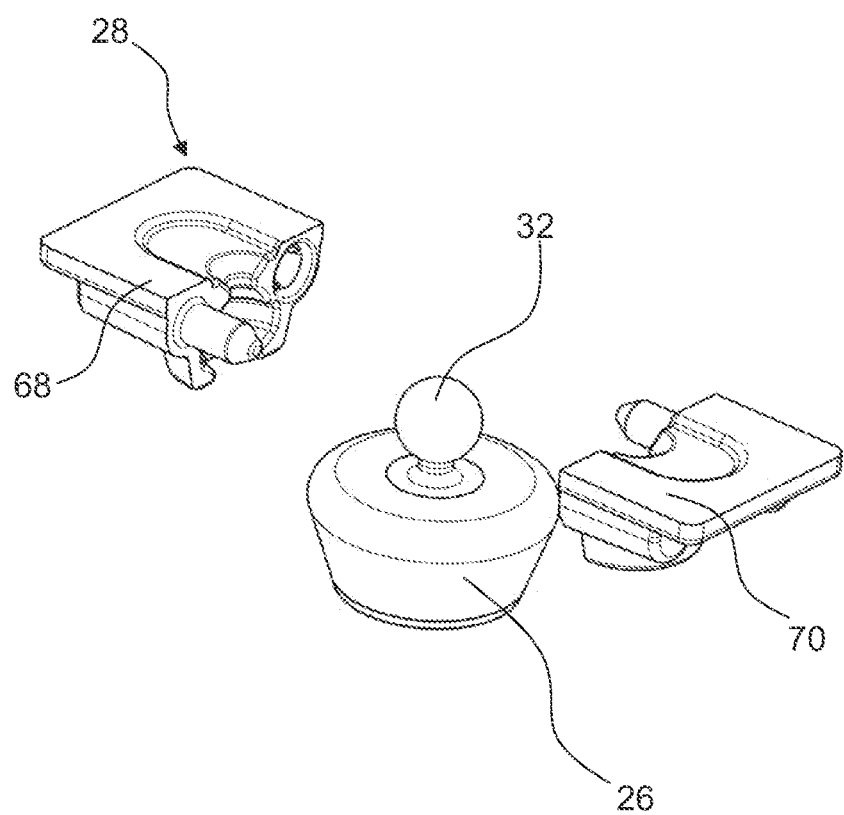
FIG. 7 shows part of the sensor in an exploded view.

In FIG. 7, the bearing 28 and the inertia body 26 are shown in an exploded view. It is evident from FIG. 7 that the bearing shell 30 is formed in two parts of two shell halves 68, 70, the two shell halves 68, 70 being put together to form the bearing 28.

The two shell halves 68, 70 may be identical.

Figure 8:
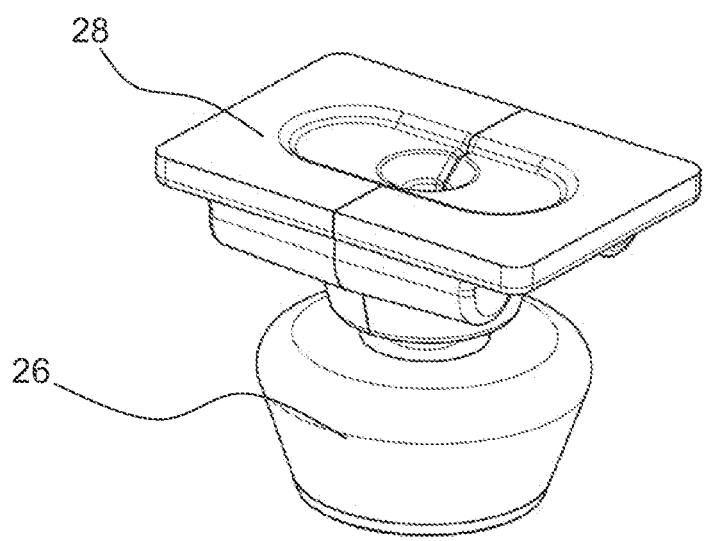
FIG. 8 shows the sensor in the assembled state.

FIG. 8 illustrates the bearing 28 with the inertia body 26 suspended therein in the assembled state.

Figure 9:
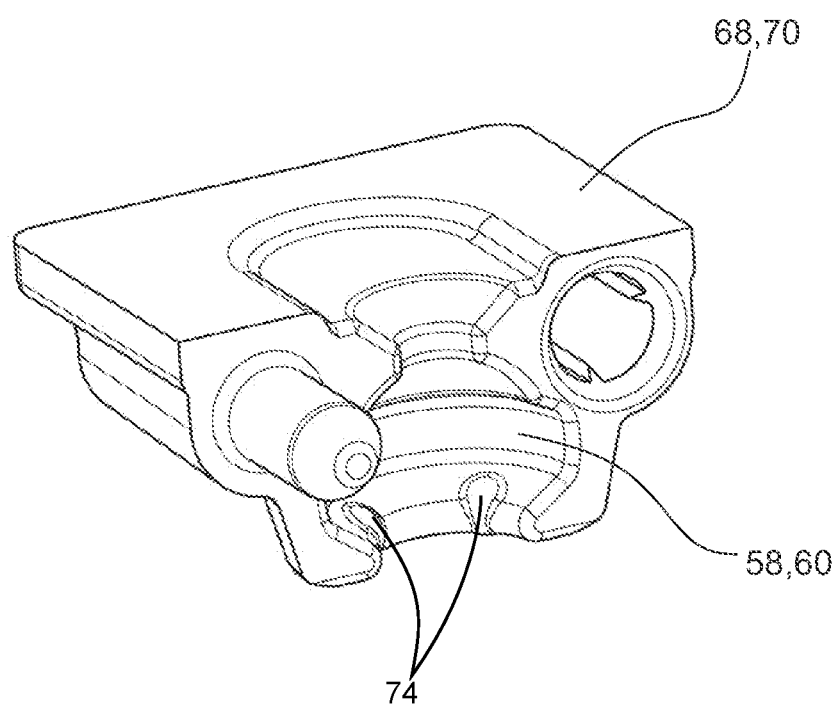
FIGS. 9 and 10 show a shell half of a bearing.
Figure 10:
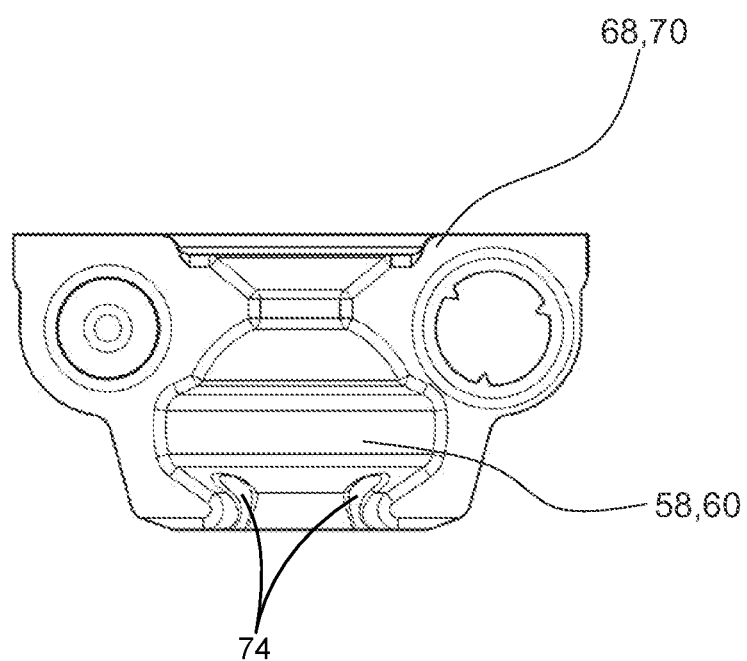

In FIGS. 9 and 10, a shell half 68, 70 of the bearing 28 is shown in different views. It is visible in said Figures that the pendulum is mounted substantially singularly in this embodiment. To this end, two projections 74 designed in the form of ball sections are formed in each of the shell halves 68, 70. The ball 32 rests on said projections 74. In this embodiment, a total of four projections 74 are provided for mounting the ball, in a deviating design of the bearing shells, in particular when the configuration is not mirror-inverted, ideally three evenly distributed projections serve for mounting the ball. In deviation therefrom, however, mounting via more than four projections, or in deviation therefrom, ring-shaped or flat mounting over the ball surface is also possible. In the following, the functioning of the sensor 12 shall be described.

When a vehicle in which the sensor 12 is installed is accelerated, the inertia body 26 is deflected as shown in FIGS. 3 and 6.

Depending on the amount of the acceleration forces acting upon the inertia body 26, the inertia body 26 swivels more or less. In FIGS. 3 and 6, the inertia body 26 is illustrated in a maximally deflected position.

Preferably, activation of the locking mechanism 14 of the belt retractor 10 will not take place before an approximately maximum deflection of the inertia body 26 has been reached. In the case of lower accelerations, usually activation of the locking mechanism 14 is not desired.

This activation behavior is achieved by the already wave-shaped geometry on the lower side of the inertia body 26.

As the outer surface of the elevation 56 is concentrical to the center M of the ball 32, the inertia body 26 moves, when it is activated, initially relative to the trigger element 34 without deflecting the same. For example, the inertia body 26 can be deflected by up to 11° without the trigger element 34 moving.

Only in the case of higher deflections, the inertia body 26 moves the trigger element 34 out of its idle position and causes the trigger element 34 to pivot about the rotation point R.

Pivoting of the trigger element 34 causes the blocking pawl 24 to engage in the locking teeth 22 of the locking mechanism 14 (see FIG. 3), which results in a blocking mechanism being triggered. Specifically, a further locking pawl, which is not visible in the Figures, is extended, thus causing external teeth formed on a side of the belt reel 18 to be engaged in teeth 72 (see FIG. 1) inside the housing 16 so that rotation of the belt reel 18 is blocked. In this way, a vehicle occupant restraint system is activated.

The invention claimed is:

1. A sensor (12) for activating a vehicle-sensitive locking mechanism (14) of a belt retractor (10), comprising a suspended inertia body (26) and a bearing (28) which supports the inertia body (26), the bearing (28) including a bearing shell (30) and a ball (32) retained in the bearing shell (30), wherein the bearing shell includes a receiving space (58) for receiving lubricant, the bearing shell having a portion spaced from the ball a distance greater than another portion of the bearing shell to define the receiving space.

2. The sensor (12) according to claim 1, wherein the receiving space (58) is formed by an at least partially circumferential groove (60) in the bearing shell (30).

3. The sensor (12) according to claim 1, wherein the bearing shell (30) is formed of two shell halves (68, 70) which are put together.

4. The sensor (12) according to claim 1, wherein the inertia body (26) is secured to the ball (32).

5. The sensor (12) according to claim 1, wherein the inertia body (26) includes a metal body (46) through which an insert (48) made of plastic extends.

6. The sensor (12) according to claim 5, wherein the ball (32) is part of the insert (48).

7. The sensor (12) according to claim 1, wherein in the bearing shell (30) there are provided a first opening (62) through which the inertia body (26) extends, and a second opening (64) facing the first opening (62), the second opening (64) being communicated with a lubricant reservoir (66).

8. The sensor (12) according to claim 1, wherein a collar (38) formed for retaining the bearing shell (30) in the belt retractor (10) is formed integrally on the bearing shell (30).

9. The sensor (12) according to claim 1, wherein the sensor (12) includes a trigger element (34) which can be moved out of an idle position by a movement of the inertia body (26) so as to activate the vehicle occupant restraint system in this way, with the inertia body (26) being pivotable about a stationary rotation point (M).

10. The sensor (12) according to claim 9, wherein the trigger element (34) is configured to engage a blocking pawl (24) in locking teeth (22) of a locking mechanism (14).

11. A belt retractor (10) comprising a vehicle-sensitive locking mechanism (14) and the sensor (12) according to claim 1.

12. A sensor (12) for activating a vehicle-sensitive locking mechanism (14) of a belt retractor (10), comprising a suspended inertia body (26) and a bearing (28) which supports the inertia body (26), wherein the bearing (28) includes a receiving space (58) for receiving lubricant, wherein in the bearing shell (30) there are provided a first opening (62) through which the inertia body (26) extends, and a second opening (64) facing the first opening (62), the second opening (64) being communicated with a lubricant reservoir (66).

* * * * *